Sept. 27, 1949.  A. E. BISHOP  2,482,961
FRICTION DEVICE FOR DAMPING SHIMMY IN CASTER WHEELS
Filed Jan. 16, 1948
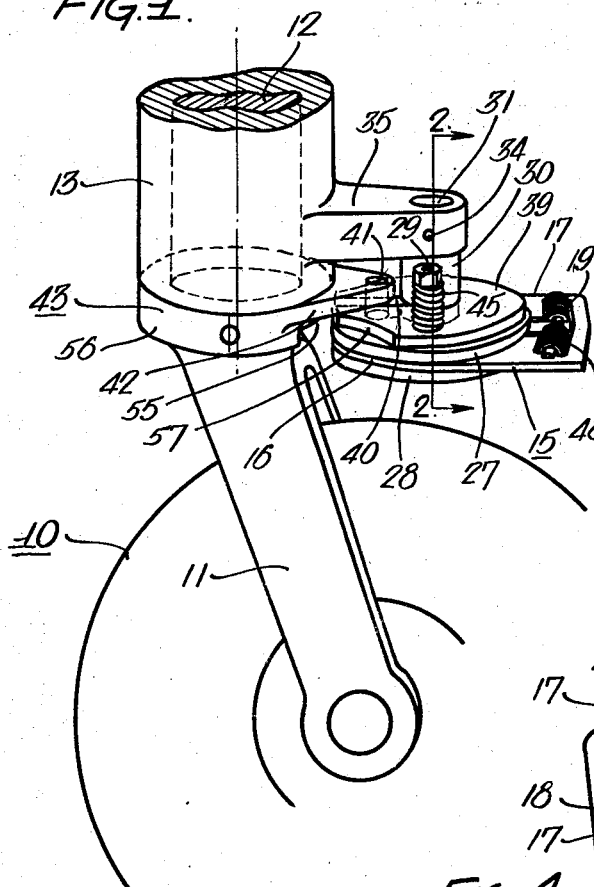
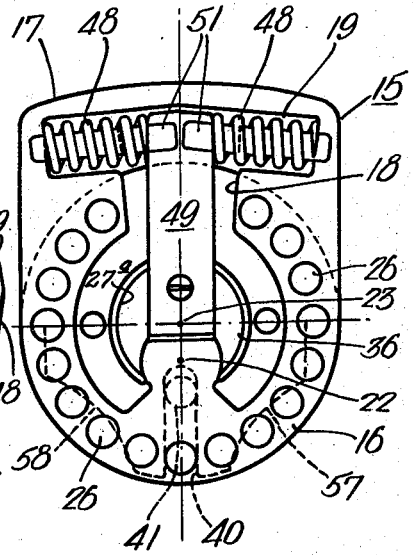
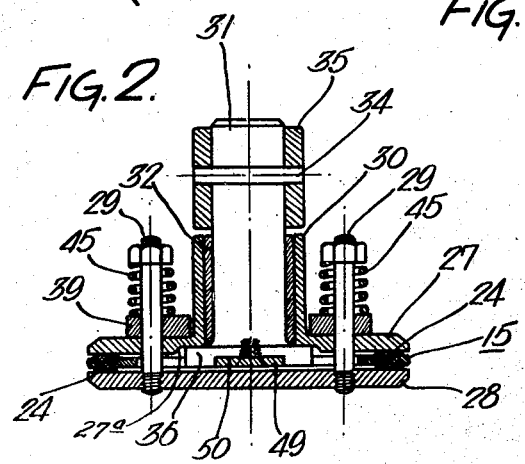
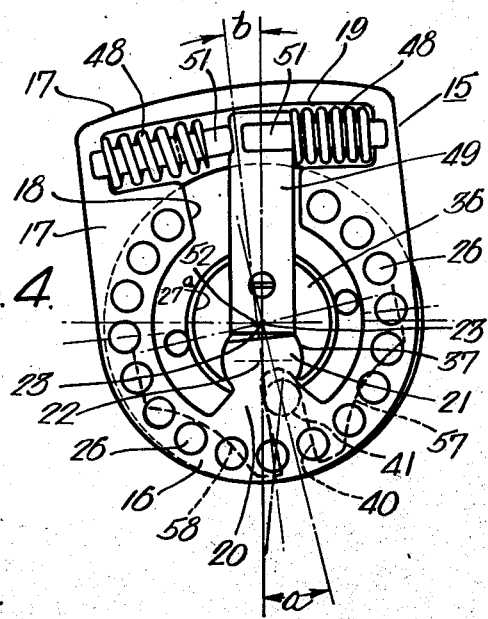
Inventor:
Arthur E. Bishop
by his Attorneys
Howson & Howson Patented Sept. 27, 1949

2,482,961

UNITED STATES PATENT OFFICE 2,482,961

FRICTION DEVICE FOR DAMPING SHIMMY IN CASTER WHEELS

Arthur E. Bishop, Chatswood, near Sydney, New South Wales, Australia

Application January 16, 1948, Serial No. 2,763

11 Claims. (Cl. 16—35)

This invention relates to new and useful improvements in frictional torque resistance devices for damping swivelling oscillations or wobble in caster wheels without limiting normal turning movement of the caster wheel stock and, while the invention is adaptable to any caster wheel subject to swivelling oscillations or wobble about the caster stock pivot, it is especially adaptable to the caster wheels of aircraft. The invention is particularly useful when applied to light types of aircraft.

In United States Patent No. 2,367,993 the problem of swivelling oscillations or shimmy is described with relation to hydraulic devices for damping shimmy without restricting normal turning movement of the caster wheel stock. The present invention provides a frictional torque resistance device which is cheaper to manufacture, easier to service and maintain and, when applied in the manner herein described, has certain functional advantages over hydraulic damping devices.

In the hydraulic devices described in the aforesaid patent the torque resistance rises in a gradual curve to the maximum and at a low amplitude of shimmy the torque resistance is low. In frictional torque resistance devices the torque resistance exists prior to shimmy movement. The advantage of this is that a frictional torque resistance device can be designed to work at low maximum torque values whereas in the hydraulic device it is necessary to provide for high maximum torque values in order to obtain effective resistance to shimmy at low rates of shimmy movement.

With the foregoing in mind, the principal object of the present invention is to provide a novel torque resistance device of the frictional type which is operable for damping swivelling oscillations or shimmy in caster wheels.

Another object of the invention is to provide a novel resistance device as set forth which is operable effectively to damp swivelling oscillations or shimmy in caster wheels without limitation of normal turning movement of the caster wheel stock pivot.

A further object of the invention is to provide a novel frictional resistance device having the features and characteristics set forth which is of relatively simplified construction, is comparatively inexpensive to manufacture and maintain, and is highly efficient and effective in operation and use.

These and other objects of the invention and the various features and details of the construction and operation thereof are hereinafter fully set forth and described with reference to the accompanying drawing, in which:

Fig. 1 is a perspective view of an airplane swivel wheel incorporating a frictional damping device embodying the present invention;

Fig. 2 is an enlarged sectional view on line 2—2, Fig. 1;

Fig. 3 is a plan view of the frictional resistance device from the underside thereof with the lower cover plate removed and the parts in the in-line position; and Fig. 4 is a view similar to Fig. 3 showing the relative position of the parts when turned to an out-of-line position.

With reference to the drawing, the present invention is illustrated in conjunction with the swivel wheel 10 of an aircraft. As shown in Fig. 1, the swivel wheel 10 is mounted in a fork 11 which has its tubular stock 12 rotationally mounted in a strut casing 13 that functions as a journal bearing for said stock and is fixed to an aircraft, either rigidly or retractably, in well-known manner.

A frictional torque resistance device made according to the present invention comprises at least one plate 15 having a generally annular portion 16 and an outwardly projecting generally rectangular portion 17 of approximately the same width as the diameter of the annular plate portion 16. The plate 15 is provided with a radial slot 18 therein which at its outer end intersects centrally a crosswise or transverse slot 19 in the plate portion 17 thus forming a T-shaped opening in the plate 15. At the diametrically opposite side of the plate 15 from the radial slot 18 therein, there is an inwardly directed radial projection 20 having a head portion 21 of substantially circular configuration which has its center 22 disposed radially outward from the center 23 of the plate portion 16 (in its in-line position, Fig. 3) a distance about one-quarter the radial dimension of said plate portion 16.

Secured in the annular plate portion 16 circumferentially thereof is a plurality of inserts 24 composed of material having a high coefficient of friction and including projecting pad portions 26 disposed at opposite sides or faces of the plate 15. Arranged at opposite sides of the plate 15 and adapted to engage the friction pads 26 are upper and lower cover plates 27 and 28, respectively, which are connected together and secured against rotation relative to each other by means of studs 29 which pass through the upper cover plate 27 inwardly of the plate annular portion 16 and have their lower ends threaded into the lower cover plate 28, for example, as shown in Fig. 2 of the drawing.

The upper cover plate 27 is provided with an upwardly extending concentric hub or neck portion 30 in which is rotatably journaled a spindle 31, for example, by means of a bearing 32. The upper end of the spindle 31 is fixedly secured, for example, by a pin 34, in the outer extremity of a boss or projection 35 which is provided on the strut casing 13 and extends rearwardly therefrom in a direction corresponding to the in-line position of the caster wheel 10 so that the axis of the adjacent spindle 31 lies in a vertical plane containing the in-line axis of the assembly. The plate 27 is provided with a concentric recess 27a and the spindle 31 is provided with an enlarged flat base portion 36 which is recessed in said recess 27a and disposed intermediate the cover plates 27 and 28. The base portion 36 is provided with a cut-out or recess 37 corresponding substantially to the circular head portion 21 of the plate 15. The circular head portion 21 is received in the cut-out 37 and provides for limited rotation of the plate 15 in the horizontal plane relative to the spindle 31.

Secured in overlying relation upon the upper cover plate 27 by means of the aforesaid studs 29 is an actuator plate 39 which is bored to clear the cover plate hub portion 30 and is provided in its normally forward portion with an elongated radially extending slot 40 that is open at its outer end. Normally engaged within the elongated radial slot 40 in the plate 39 is a depending pin 41 which is carried at the outer end of a rearwardly projecting lug portion 42 provided on a collar 43 that is secured to the fork 11 for rotation therewith relative to the wheel stock casing 13. The plate 39 is maintained seated upon the upper cover plate 27, and the latter and the lower cover plate 28 are urged into gripping or clamping engagement with the friction pads 26 at opposite sides of the plate 15, by means of coil springs or the like 45 which surround the aforesaid studs 29 and act between the upper surface of the actuator plate 39 and the underside of nuts or the like 46 threaded on the upper ends of said studs, for example, as shown in Fig. 2 of the drawing.

Relative rotation of the plate 15 with respect to the spindle 31, which is fixedly mounted, is opposed by springs 48 of suitable strength arranged in the slot 19 at respectively opposite sides of an arm or lever 49 that is secured in a recess 50 provided in the underside of the spindle base portion 36. The arm 49 extends radially of the spindle 31 outwardly through the slot 18 in the plate 15, and the springs 48 are retained in the slot 18 relative to the arm 49 by means of dowels or the like 51 which extend within the spring coils and have their inner and outer ends slotted to receive the outer end portion of the arm 49 and the plate portion 17, respectively, as shown.

In operation of the device, as the wheel 10 casters in one direction from the in-line position, carrying with it the fork 11 and collar 43, the pin 41 carried by the latter and engaged within the slot 40 causes the plate 39 to rotate in the opposite direction carrying with it the upper and lower cover plates 27 and 28. The intermediate plate 15 tends to rotate with the cover plates 27 and 28 by reason of its frictional engagement therewith but is restrained by reason of the fact that the center 22, about which the plate 15 rotates, is offset from the rotational center of the spindle 31 about which the plates 27 and 28 rotate. This causes a restraining torque to be exerted which is the product of the shearing forces of the surfaces in frictional contact and the lateral displacement of the two axes of rotation 22 and 23, respectively.

The restraining torque at the commencement of movement in the illustrated embodiment of the invention normally will be about one-fourth the amount of torque exerted by the surfaces in frictional contact when full rotation occurs and, as further relative rotation takes place between the cover plates 27 and 28 and the intermediate plate 15, the arm 49 compresses the spring 48 which is opposing movement of the plate 15 until a condition of equilibrium is reached, for example as shown in Fig. 4 of the drawing, at which time the relative shearing movement ceases and rotation occurs in opposition to uniform restraint. With reference to Fig. 4, the device is illustrated with its several parts in the relative positions occupied thereby when the actuator plate 39 has been rotated about the center 23 through an acute angle $a$ and the intermediate plate 15 has been actuated about the center 22 in the same direction through an acute angle $b$ by frictional engagement of said plate 15 with the upper and lower plates 27 and 28. In rotating through the acute angle $b$, the center 23 of the plate 15 has moved laterally the distance between the center 23 and a point 52, and substantially all of this lateral displacement of the center 23 takes place in the first few degrees of rotation of the actuator plate 39 with the result that the torque resistance of the device and the commencement of movement of the intermediate plate is the product of the total force required to drag the intermediate plate 15 laterally between the cover plates 27 and 28, and the distance between the centers 22 and 23. In the normal operation of the device, for example during taxi and turning operations of an aircraft, small oscillations of the swivel wheel are transmitted to the intermediate friction plate 15 with consequent slight shearing movement of the surfaces in frictional contact. This allows the wheel 10 readily to respond to castering forces while an initial and sudden great deflection of the wheel will be effectively damped by the immediate operation of the device.

From the foregoing it will be observed that the present invention provides a novel torque resistance device of the frictional type which is operable for damping swivelling oscillations or shimmy in caster wheels without limitation of normal turning movement of the caster wheel stock pivot. The invention further provides a novel frictional resistance device having the features and characteristics set forth which is of relatively simplified construction, is comparatively inexpensive to manufacture and maintain, and is highly efficient and effective in operation and use.

While a particular embodiment of the invention is illustrated and described herein, it is not intended that the invention be limited to such disclosure and changes and modifications may be made therein and thereto within the scope of the claims.

I claim:

1. In apparatus for damping oscillations of a swivel caster wheel element rotatably mounted in a relatively fixed bearing element comprising an actuator member pivotally associated with one of said elements and having a radial slot formed therein and a pin secured to the other of said elements and normally operable in said slot to turn said member upon relative rotation between said elements, means for retarding free pivotal movement of said actuator member throughout a predetermined angle of operating range thereof to damp oscillations of said wheel element within a predetermined angle of controlled rotation including a plate rotatable with said actuator member, a friction member rotatable relative to said plate and in frictional contact therewith tending to cause said friction member to rotate with the plate, and spring means opposing rotational movement of the friction member in either direction and tending normally to center the same.

2. In apparatus for damping oscillations of a swivel caster wheel element rotatably mounted in a relatively fixed bearing element comprising an actuator member pivotally associated with one of said elements and having a radial slot formed therein and a pin secured to the other of said elements and normally operable in said slot to turn said member upon relative rotation between said elements, means for retarding free pivotal movement of said actuator member throughout a predetermined angle of operating range thereof to damp oscillations of said wheel element within a predetermined angle of controlled rotation including a plate rotatable with said actuator member, a friction member adjacent said plate and rotatable relative thereto, elements of high friction coefficient carried by said friction member in frictional contact with said plate tending to cause the friction member to rotate therewith, and spring means opposing rotational movement of the friction member in either direction and tending normally to center the same.

3. In apparatus for damping oscillations of a swivel caster wheel element rotatably mounted in a relatively fixed bearing element comprising an actuator member pivotally associated with one of said elements and having a radial slot formed therein and a pin secured to the other of said elements and normally operable in said slot to turn said member upon relative rotation between said elements, means for retarding free pivotal movement of said actuator member throughout a predetermined angle of operating range thereof to damp oscillations of said wheel element within a predetermined angle of controlled rotation thereof including a plate rotatable with said actuator member, a friction member rotatable relative to said plate about a center offset from the center of rotation of said plate and in frictional contact with the plate tending to cause said friction member to rotate with the plate, and spring means opposing rotational movement of the member in either direction and tending normally to center the same.

4. In apparatus for damping oscillations of a swivel caster wheel element rotatably mounted in a relatively fixed bearing element comprising an actuator member pivotally associated with one of said elements and having a radial slot formed therein and a pin secured to the other of said elements and normally operable in said slot to turn said member upon relative rotation between said elements, means for retarding free pivotal movement of said actuator member throughout a predetermined angle of operating range thereof to damp oscillations of said wheel element within a predetermined angle of controlled rotation thereof including a plate rotatable with said actuator member, a friction member rotatable relative to said plate about a center offset from the center of rotation of said plate, elements of high friction coefficient carried by said member and in frictional contact with said plate tending to cause said friction member to rotate with the plate, and spring means opposing rotational movement of the member in either direction and tending normally to center the same.

5. In apparatus for damping oscillations of swivel caster wheel element rotatably mounted in a relatively fixed bearing element comprising an actuator member pivotally associated with one of said elements and having a radial slot formed therein and a pin secured to the other of said elements and normally operable in said slot to turn said member upon relative rotation between said elements, means for retarding free pivotal movement of said actuator member throughout a predetermined angle of operating range thereof to damp oscillations of said wheel element within a predetermined angle of controlled rotation thereof including a pair of relatively spaced plates rotatable with said actuator member, a friction member intermediate said plates rotatable relative thereto, and in frictional contact therewith tending to cause said friction member to rotate with the plates, and spring means opposing rotational movement of the member in either direction and tending normally to center the same.

6. In apparatus for damping oscillations of a swivel caster wheel element rotatably mounted in a relatively fixed bearing element comprising an actuator member pivotally associated with one of said elements and having a radial slot formed therein and a pin secured to the other of said elements and normally operable in said slot to turn said member upon relative rotation between said elements, means for retarding free pivotal movement of said actuator member throughout a predetermined angle of operating range thereof to damp oscillations of said wheel element within a predetermined angle of controlled rotation thereof including a pair of relatively spaced plates rotatable with said actuator member, a friction member intermediate said plates rotatable relative thereto about a center offset from the center of rotation of said plates and in frictional contact with said plates tending to cause said friction member to rotate with the plates, and spring means opposing rotational movement of the member in either direction and tending normally to center the same.

7. In apparatus for damping oscillations of a swivel caster wheel element rotatably mounted in a relatively fixed bearing element comprising an actuator member pivotally associated with one of said elements and having a radial slot formed therein and a pin secured to the other of said elements and normally operable in said slot to turn said member upon relative rotation between said elements, means for retarding free pivotal movement of said actuator member throughout a predetermined angle of operating range thereof to damp oscillations of said wheel element within a predetermined angle of controlled rotation thereof including a pair of relatively spaced plates rotatable with said actuator member, a member intermediate said plates and rotatable relative thereto about a center offset from the center of rotation of said plates, elements of high friction coefficient carried by said member and in frictional contact with said plates tending to cause said member to rotate with the plates, and spring means opposing rotational movement of the member in either direction and tending normally to center the same.

8. Apparatus for damping oscillations of a swivel wheel comprising a rotatable plate, a friction member rotatable relative to said plate and in frictional contact therewith tending to cause said friction member to rotate with the plate, means actuable by the swivel wheel to rotate said plate in response to oscillations of said wheel, and means opposing rotational movement of the friction member in either direction tending normally to center the same and restraining rotation of said plate.

9. Apparatus for damping oscillations of a swivel wheel comprising a rotatable plate, a friction member adjacent said plate and rotatable relative thereto, elements of high friction coefficient carried by said friction member in frictional contact with said plate tending to cause said friction member to rotate with the plate, means actuable by the swivel wheel to rotate said plate in response to oscillations of said wheel, and means opposing rotational movement of the friction member in either direction tending normally to center the same and restraining rotation of said plate.

10. Apparatus for damping oscillations of a swivel wheel comprising a rotatable plate, a friction member rotatable relative to said plate about a center offset radially from the center of rotation of said plate and in frictional contact therewith tending to cause said friction member to rotate with the plate, means actuable by the swivel wheel to rotate said plate in response to oscillations of said wheel, and means opposing rotational movement of the friction member in either direction tending normally to center the same and restraining rotation of said plate.

11. Apparatus for damping oscillations of a swivel wheel comprising a pair of relatively spaced plates rotatable as a unit in response to oscillations of the swivel wheel, a member intermediate said plates rotatable relative thereto about a center offset from the center of rotation of said plates, elements of high friction coefficient carried by said member and in frictional contact with said plates tending to cause said member to rotate with the plates, and means opposing rotational movement of said member tending normally to center the same and restraining rotation of the plates.

ARTHUR E. BISHOP.

No references cited.